United States Patent [19]

Gibbons et al.

[11] Patent Number: 4,557,891

[45] Date of Patent: Dec. 10, 1985

[54] PRESSURIZED WATER REACTOR FLOW ARRANGEMENT

[75] Inventors: John F. Gibbons, Windsor; Richard W. Knapp, West Simsbury, both of Conn.

[73] Assignee: Combustion Engineering, Inc., Windsor, Conn.

[21] Appl. No.: 371,882

[22] Filed: Apr. 26, 1982

Related U.S. Application Data

[63] Continuation of Ser. No. 773,465, Mar. 2, 1977, abandoned.

[51] Int. Cl.⁴ .............................................. G21C 15/00
[52] U.S. Cl. ................................... 376/397; 376/243; 376/353; 376/399
[58] Field of Search ............... 376/397, 400, 399, 353, 376/243

[56] References Cited

U.S. PATENT DOCUMENTS

| | | | |
|---|---|---|---|
| 3,151,034 | 9/1964 | Douglass, Jr. et al. | 376/406 |
| 3,226,300 | 12/1965 | Zmola et al. | 376/406 |
| 3,384,549 | 5/1968 | Deliege et al. | 376/406 |
| 3,392,087 | 7/1968 | Braun et al. | 376/221 |
| 3,660,230 | 5/1972 | Bailey et al. | 376/334 |
| 3,816,245 | 6/1974 | Bevilacqua | 376/282 |

FOREIGN PATENT DOCUMENTS

| | | |
|---|---|---|
| 264677 | 12/1967 | Austria . |
| 1249412 | 9/1967 | Fed. Rep. of Germany . |
| 2331352 | 2/1974 | Fed. Rep. of Germany . |
| 1560777 | 3/1969 | France . |
| 2164907 | 8/1973 | France . |
| 883717 | 12/1961 | United Kingdom . |
| 1102606 | 2/1968 | United Kingdom . |

*Primary Examiner*—Harvey E. Behrend
*Attorney, Agent, or Firm*—Edward L. Kochey, Jr.

[57] ABSTRACT

A pressurized water nuclear reactor of the type with vertical control rods passing through the core surrounded by control rod guide tubes. A major portion of the water flow is passed directly to the bottom of the core for upward flow therethrough. A minor portion pressurizes a volume at the top of the vessel and passes downwardly through the control rod guide tubes to join the major portion of flow at the lower end of the core.

2 Claims, 2 Drawing Figures

PRESSURIZED WATER REACTOR FLOW ARRANGEMENT

This is continuation of application Ser. No. 773,465 filed Mar. 2, 1977, now abandoned.

BACKGROUND OF THE INVENTION

This invention relates to a pressurized water cooled nuclear reactor and in particular to a flow path therethrough.

A pressurized water cooled nuclear reactor conventionally includes a core formed of vertically supported fuel element and vertically movable control rods passing therethrough. These controls rods are surrounded by guide tubes at least through the core to assure proper guidance of their movement. Flow of the coolant water is upward through the core to insure stability of flow in the event of any localized steam or overheating.

While the control rods contain no fuel they do absorb neutrons and thereby generate some heat. Cooling of the control rods is, therefore, required. The conventional method of cooling these rods involves passing a portion of the flow upwardly through the control rod guide tubes which may then exit either in the outlet plenum or in an upper portion of the reactor vessel from which location the flow passes to the outlet.

The flow passing through these guide tubes is in parallel with the flow actually passing over and cooling the fuel assemblies. It, therefore, must be severely restricted to avoid an undue reduction in the thermal performance of the core. This flow must pass through the guide tubes when the control rods are withdrawn as well as when they are inserted. The flow path has a relatively low pressure drop when they are withdrawn, and a concomitant increase in flow. In order to restrict these variations in flow, orifices must be placed at the inlet of the guide tubes. This cannot avoid the increase in core by-pass when the rods are withdrawn but it does minimize the extent to which the flow increases. The use of orifices involves not only the expense of installing these but also the potential of plugging which is inherent in any flow restriction which is put within a nuclear reactor.

The selection of the particular by-pass flow quantity through the control rod guide tubes requires a critical allocation of flow, since there must be sufficient flow to properly cool the rods in the fully inserted position, but any excess flow used needlessly degrades the thermal performance of the reactor core.

Since flow is upwardly along the control rods there is an upward force due to the drag of the fluid flow as well as the pressure difference between the bottom and upper portion of the control rod. The force resists the downward movement required in scramming a reactor, thereby lengthening scram time and increasing the forces required to drive the control rods down beyond what they would be in the absence of such flow arrangements.

In the conventional arrangement, the pressure below the core is higher than the pressure at the outlet of the core due to the friction drop of the flow passing therethrough. This results in a significant upward force on the core in the order of 3,000,000 newtons for a 280 kilopascal pressure drop. Since the entire upper portion of a conventional reactor vessel is at the outlet pressure this force can be resisted only by structures which transmit the force to the reactor vessel or reactor head.

In the conventional arrangement, the upper portion of the reactor vessel is not only at outlet pressure but also at outlet temperature. The core support barrel is the structure which separates the two pressure and temperature volumes. The support barrel is generally supported at the top of the reactor vessel body immediately adjacent the bolted joint between the head and the body. The complex structure in this area must not only tolerate the physical forces due to the internal pressure as transmitted through the bolts but must also simultaneously tolerate the thermal stresses due to the temperature difference on the two sides of the core barrel at the joint area.

SUMMARY OF THE INVENTION

In the nuclear reactor according to the present invention the major portion of the water flow follows the conventional flow path. It passes into the vessel and downwardly between the core support barrel and the vessel entering the core at the bottom, and then passes upwardly therethrough. A minor portion of the flow, however, passes through the core support barrel to the upper portion of the reactor vessel thereby effecting a pressure level in the top of the vessel which is significantly above the core outlet pressure. The flow from this location passes downwardly through the guide tubes to cool the control rods and joins the major portion of the flow near the bottom of the core. This minor portion of flow joins the major portion at this location so that the total flow passes upwardly through the core in contact with the fuel assemblies.

The force required to scram the control rods is reduced as a result of this flow path. Since the flow is downwardly through the control rod guide tubes all drag forces aid in scramming control rods. Furthermore, since the pressure at the top of the control rod approaches inlet pressure rather than outlet pressure there is an additional pressure differential to aid in the scram of the control rods.

This arrangement also avoids or minimizes by-pass of flow around the core. Since all the flow which passes over and cools the control rods joins the main flow before passage through the core there is no by-pass of the core. The only by-pass that could occur is that due to leakage at any sealed joints in the structure. Such leakage would only be a function of one's ability to effect tight seals and not a function of any flow required for cooling. The seal provided by normal fits between the fuel assemblies and their guide structure is sufficiently good to reduce leakage flow to a fraction of that which is currently accepted in conventional control rod cooling arrangements.

Since by-pass of the flow which passes over the control rods is avoided, this decreases the criticality of the design to allocate flow to cooling the control rod. Substantial excess flow can be used to cool the control rods since it has no deleterious effect on reactor performance. Therefore, orifices are not required in the control rod channels for the purpose of limiting flow.

The structure also provides a pressurized volume in the upper portion of the reactor vessel. This is approximately the inlet pressure to the vessel as compared to the outlet pressure in prior art designs. The presence of this pressure exerts a substantial downward force on the seal plate which separates this pressurized dome from the outlet plenum. Since the seal plate can be connected to other structures such as the core support barrel it reduces or eliminates the supplemental force required to hold down the core support barrel. Furthermore, this core structure hold down force is a function of the actual reactor coolant flow. Therefore, uncertainties in the coolant flow, in design or operation, are automatically compensated by appropriate hold down force variation.

Since the inlet temperature exists not only in the annular space between the core support barrel and the reactor vessel but also in the dome, the temperature difference at the reactor vessel closure is reduced. This reduces thermal stresses in the bolts during steady state operation and minimizes them during transient operation.

DESCRIPTION OF THE PREFERRED EMBODIMENT

Figure 1:
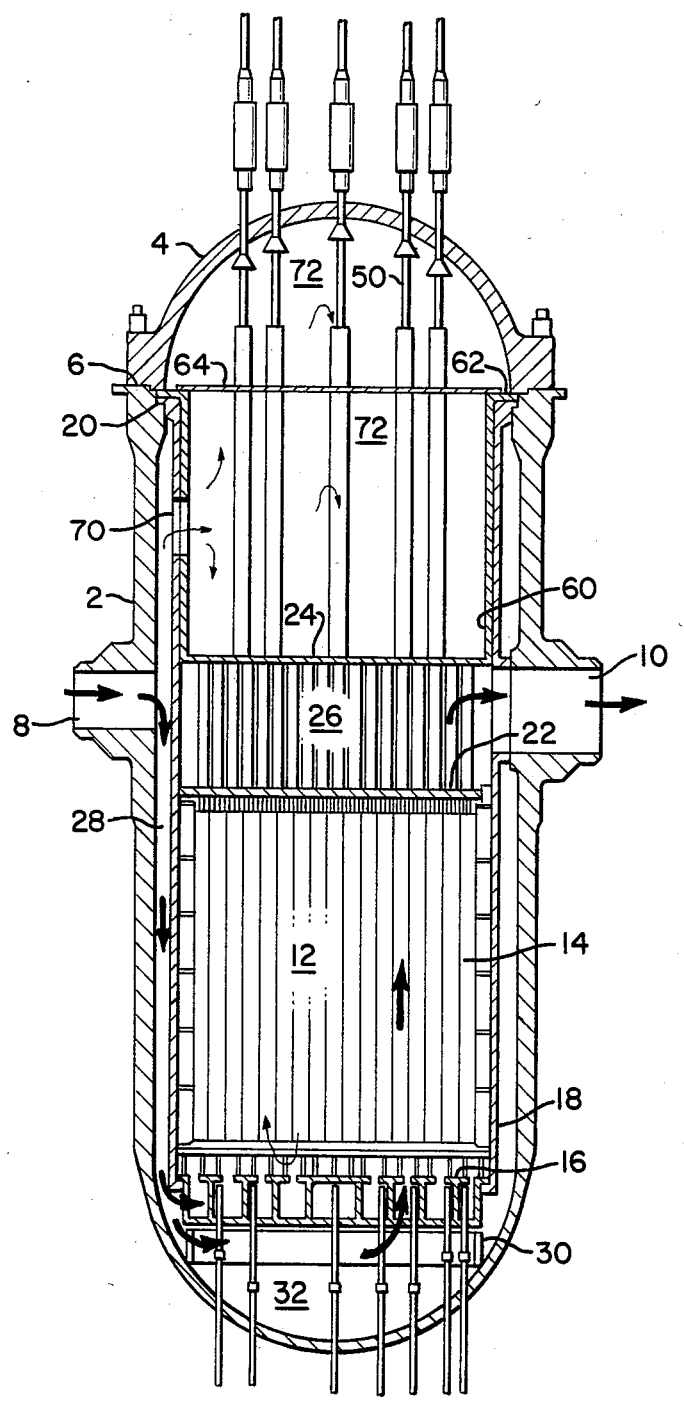
FIG. 1 is a sectional elevation of the general arrangement of a nuclear reactor which illustrates the general structure and the flow paths therethrough.
Figure 2:
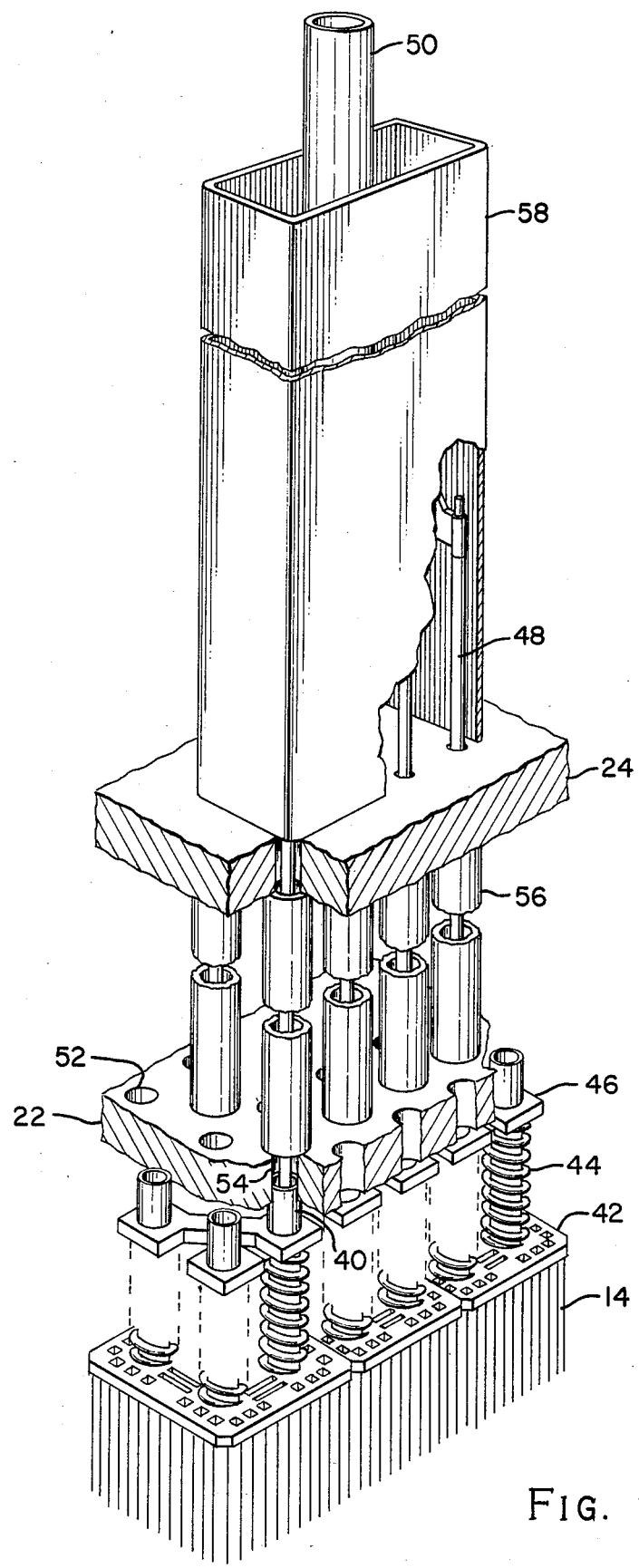
FIG. 2 is an isometric view of a detail in the area of the outlet plenum.

A reactor vessel body 2 and a reactor vessel head 4 are joined by a bolted connection at flange 6. The reactor vessel body has an inlet opening 8 and an outlet opening 10 for flow of coolant water therethrough.

A core 12 is comprised of a plurality of fuel assemblies 14, each of which is comprised of a plurality of elongated fuel rods. The core is supported on the core support assembly 16 which is in turn supported by the core support barrel 18. This core support barrel is supported by flange 20 from the reactor vessel body 2 at a location adjacent the flange 6.

Immediately above the core 12 is a fuel assembly alignment plate 22 which serves to engage the upper ends of the fuel assemblies and to maintain alignment thereof. A seal plate structure 24 is located above the alignment plate, thereby defining the outlet plenum 26.

After the coolant enters through inlet opening 8 a first quantity comprising the bulk of the flow passes downwardly through the annular space 28 between the reactor vessel and the core support barrel. This flow passes downwardly through the flow skirt 30 into an inlet plenum 32 located below the core 12. The flow passes upwardly through the core and through openings in the alignment plate 22 into the outlet plenum 26. From here the flow passes out through outlet opening 10 to a steam generator (not shown).

Each of the fuel assemblies 14 contain within their structure four control rod guide tubes 40 which pass through the entire length of the fuel assembly. These guide tubes extend upwardly above the upper fuel assembly end plate 42. The extensions are surrounded by hold down springs 44 which bear against the fuel assembly upper end fitting 46. These end fittings in turn bear against the fuel assembly alignment plate 22 whereby the fuel assemblies 14 are held down through the compressive action of the springs.

Finger shaped control rods 48 are vertically movable within the guide tubes 40 of the fuel assemblies. Each of these rods individually extends to an elevation above the seal plate 24 at which location they may be joined in subgroupings to the control rod extension 50.

In addition to the flow holes 52, the alignment plate 22 also has openings 54 through which the control rods pass. The extensions of the guide tube 40 pass into these openings with a machined close fit. This joint should be such as to take horizontal forces so that the fuel assemblies can be aligned, and must permit vertical movement to allow for expansion of the different fuel assemblies. Since leakage at this joint bypasses the core, minimizing leakage is efficacious in carrying out this invention. Conventional fits used for alignment are, however, sufficient to maintain by-pass leakage well below the core by-pass of prior art designs.

Control rod shroud tubes 56 pass through the outlet plenum 26 and may be welded to the alignment plate 22 and the seal plate structure 24. These shroud tubes surround and protect the control rods from the effects of cross flow through the plenum 26.

Extending above the seal plate 24 is the control assembly shroud 58. This surrounds a group of control rods which are joined to a single control rod extension. This shroud protects the control rods from localized transverse flow effects.

Since the seal plate 24 is used not only as a seal plate but also as part of the structural arrangement for the upper guide assembly it is supported from barrel 60 to form a more rigid structure. Furthermore, it permits the entire structure including the fuel assembly alignment plate 22 to be removed when refueling to expose the fuel assemblies. This barrel 60 is supported by flanges 62 resting on flanges 20 of the core support barrel. The upper guide structure support plate 64 is open to permit flow therethrough.

A flow opening 70 is provided through the core support barrel and also through the upper guide assembly barrel so that a second minor portion of the flow entering the reactor vessel passes into the pressurized chamber 72. The control assembly shrouds 58 are open at the upper end and may have openings at various locations throughout the length whereby the minor portion of flow passes downwardly inside these shrouds. The flow then passes downwardly through the control element shroud tube 56 into the fuel assembly control rod guide tubes 40. This second minor portion of flow continues through the length of the fuel assemblies inside the guide tube to a location near the bottom of core 12 where it passes outwardly joining the first main portion of flow. These two flows are then combined and the total quantity passes upwardly through the core 12 and outlet plenum 26.

It can be seen the two parallel flow paths exist between the inlet 8 and the bottom of core 12. The pressure drop is essentially established by the larger first portion of flow passing down through the annular space 28. The remaining portion of the flow passing through the other path experiences the same pressure drop with the flow being established by the geometry of the flow path. It is preferred that the portion of this flow path from the inlet 8 to the pressurized chamber 72 be of low resistance and, therefore, have a relatively low pressure drop. The portion of the flow path through the assembly shroud and ultimately through the guide tubes 40 should have a major portion of the available pressure drop. This tends to maintain the pressure in the pressurized plenum 72 at a relatively high pressure level. It also results in improved distribution between the various control rod guide tubes.

The design flow passing through the guide tubes should be sufficient to remove all the heat generated within the control rods. Since none of the flow bypasses the core, this flow may be conveniently selected on the high side thereby resulting in increased design tolerance.

Since flow is downwardly along the control rods the drag forces tend to aid in reactor scram. Furthermore, while the lower end of the control rod is exposed to core inlet pressure the upper end is exposed to the higher pressure in the pressurized chamber 72 thereby further establishing a pressure differential tending to force the control rods down. Both of these characteristics aid in reducing scram time and in reducing the drive forces required.

The relatively high pressure in the pressurized chamber 72, which approximates the inlet pressure to the reactor, exerts its force on the upper side of the seal plate structure 24. The opposite side of that plate is exposed to the outlet pressure in plenum 26. If plates 24 and 22 along with the control rod shroud tubes 56 are considered to be a unitary structure the opposing force would be the pressure immediately below the fuel assembly alignment plate 22. This pressure is only slightly above the pressure in the outlet plenum 26. The pressure differential across either of these structures then is approximately equal to the pressure drop through the reactor vessel, which would be expected to be in the order of 280 kilopascals. If the plates have a diameter in the order of 3.7 meters, this amounts to 3,000,000 newtons of downward force. The core support barrel and the upper guide structure barrel of conventional designs require substantial structure to withstand the upward force produced in the core and on the other reactor elements due to the upward flow therethrough. This downward force due to the pressure difference counteracts the upward force thereby significantly reducing the amount of structure which is required to hold the reactor internals down against the reactor vessel itself. The forces tending to raise the components are a function of the flow through the reactor. It should be noted that the downward force generated by the pressure differential is of course a function of this pressure differential which in turn is a function of the flow through the reactor vessel. Therefore, the force resisting the upward thrust varies in accordance with the same parameter which increases the upward thrust and, therefore, tends to be self-compensating with variations of flow through the reactor and with variations in deposits which may occur generally throughout the flow path.

Not only is the pressure at inlet 8 and in plenum 72 approximately equal but the temperature of the fluid is equal in both locations. It follows, therefore, that during steady state operation there is no significant temperature difference across the flanges 20, 62 and 6 due to fluid temperature differences. This reduces thermal stresses in this area where pressure induced stresses are already high due to the complex nature of a bolted connection.

While a preferred embodiment of the invention has been illustrated and described, it is understood that this is merely illustrative and not restrictive and that variations and modifications may be made therein without departing from the spirit and scope of the invention.

What is claimed is:

1. A pressurized water nuclear reactor comprising:
   a reactor vessel body having an inlet opening and an outlet opening;
   a reactor vessel head secured to the top of said reactor vessel body;
   upper and lower core end plates;
   a core supported within said reactor vessel body between said upper and lower end plates;
   vertically movable control rods passing through said core;
   guide tubes surrounding said control rods and vertically extending through said core;
   a seal plate structure spaced above said upper end plate defining therebetween an outlet chamber above said core;
   a pressurized chamber located above said outlet chamber, the control rod guide tubes passing vertically through said outlet chamber into said pressurized chamber;
   a core support barrel surrounding said core and forming the outer periphery of the outlet chamber, said barrel supporting said core and thereby forming an inlet chamber there below, said core support barrel also supported within said reactor vessel body thereby forming an annular space therebetween, the annular space and the inlet chamber being in fluid communication;
   an opening through said core support barrel near the upper end thereof, said annular space, said opening, and said pressurized chamber being in fluid communication with said inlet opening for passage of water therebetween;
   a first main water flow path from said inlet opening downwardly around the periphery of said core to the lower portion of said core;
   a parallel water flow path from said inlet opening through said pressurized chamber and thence continuing through said guide tubes to the lower portion of said core; and
   a combined water flow path upwardly from the lower portion of the core through said core.

2. An apparatus as in claim 1:
   wherein said parallel water flow path has a low flow resistance from the inlet to said pressurized chamber and a high flow resistance from said pressurized chamber to the lower portion of said core.

* * * * *